United States Patent
Bagheri et al.

(10) Patent No.: US 12,481,360 B2
(45) Date of Patent: Nov. 25, 2025

(54) GAZE BASED AUTO EXPOSURE CONTROL ALGORITHM

(71) Applicant: Meta Platforms Technologies, LLC, Menlo Park, CA (US)

(72) Inventors: Saeid Bagheri, Costa Mesa, CA (US); Cesare Mercurio, Redwood City, CA (US); Ilya Brailovskiy, Fremont, CA (US); Wei Chen, Menlo Park, CA (US); Kristen Seipp, Kirkland, WA (US); Sean Delvecchio, Apopka, FL (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 412 days.

(21) Appl. No.: 18/305,237

(22) Filed: Apr. 21, 2023

(65) Prior Publication Data

US 2024/0353925 A1    Oct. 24, 2024

(51) Int. Cl.
*G06T 7/11* (2017.01)
*G06F 3/01* (2006.01)
*G06T 19/00* (2011.01)
*H04N 23/73* (2023.01)

(52) U.S. Cl.
CPC ............. *G06F 3/015* (2013.01); *G06T 7/11* (2017.01); *G06T 19/006* (2013.01)

(58) Field of Classification Search
None
See application file for complete search history.

(56) References Cited

U.S. PATENT DOCUMENTS

| | | | |
|---|---|---|---|
| 2019/0222769 A1* | 7/2019 | Srivastava | H04N 23/63 |
| 2020/0351427 A1 | 11/2020 | Smith et al. | |
| 2021/0099632 A1* | 4/2021 | Molholm | G06T 15/506 |
| 2021/0258473 A1 | 8/2021 | Yoshimura et al. | |
| 2022/0100054 A1* | 3/2022 | Galor Gluskin | H04N 23/88 |

FOREIGN PATENT DOCUMENTS

CN    106534714    *    3/2017    ............. H04N 23/71

OTHER PUBLICATIONS

European Search Report for European Patent Application No. 24162276.0, dated Jul. 3, 2024, 9 pages.

* cited by examiner

*Primary Examiner* — Beniyam Menberu
(74) *Attorney, Agent, or Firm* — Greenberg Traurig, LLP

(57) ABSTRACT

In one embodiment, a method includes receiving a user's eye gaze and using the eye gaze to determine a point of interest. The method further includes determining a current region of interest based on the point of interest, determining a temporal stability of the eye gaze by comparing the current region of interest to a past region of interest, and assigning a weight to the region of interest. The method further includes using the weight and region of interest to compute an exposure control parameter, and instructing a camera to capture an image with the exposure control parameter.

20 Claims, 9 Drawing Sheets

GAZE BASED AUTO EXPOSURE CONTROL ALGORITHM

TECHNICAL FIELD

This disclosure generally relates to camera exposure and presenting images to a user.

BACKGROUND

Artificial reality is a form of reality that has been adjusted in some manner before presentation to a user, which may include, e.g., an artificial reality (artificial reality), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Embodiments described herein cover systems, methods, and media to automatically adjust the exposure on a sensor, e.g., a camera or cameras, capturing the environment of an artificial reality device. By dynamically evaluating image data of an environment, embodiments disclosed herein automatically adjust camera exposure to the optimal brightness for points of reference within the surrounding environment. The disclosed embodiments are useful for a variety of applications, for example mixed reality environmental visualization.

In one embodiment, a computing system may receive image data (e.g., image frames of a video) comprising a perspective of an environment and utilize one or more techniques described herein to automatically adjust the exposure on the image or video capturing sensor (e.g., camera or cameras). In particular embodiments, a computing system may further utilize, for example and not by way of limitation, user eye tracking techniques to identify a region (e.g., a spatial area) within an image frame that is of interest to the user in order to be used as a point of reference for an automatic exposure control algorithm. The techniques described herein improve upon existing technology by providing an automatic sensor exposure control that takes into account user gaze information and improves the visibility of a user's field of view in the surrounding environment that can provide a more immersive experience to a user.

Certain technical challenges exist for identifying the optimal image brightness for a field of view which the user is interested in. One technical challenge may include that the optimal brightness for human eyes to view the details of the entire scene may not be the same as the optimal brightness for viewing a section of the surrounding environment of an artificial reality system. Another technical challenge may be keeping the overall image from being over-exposed such that a region of interest (ROI) preferred by the user is obscured and thus not optimally visible to the user. The solution presented by the embodiments disclosed herein to address this challenge may be to determine which region (e.g., spatial area) of an image frame is a user's current preferred region of interest (ROI), and to optimize exposure decisions based on information in those regions of the image frame.

Embodiments of the invention may include or be implemented in conjunction with an artificial reality system. Artificial reality is a form of reality that has been adjusted in some manner before presentation to a user, which may include, for example, an artificial reality (artificial reality), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, for example, used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
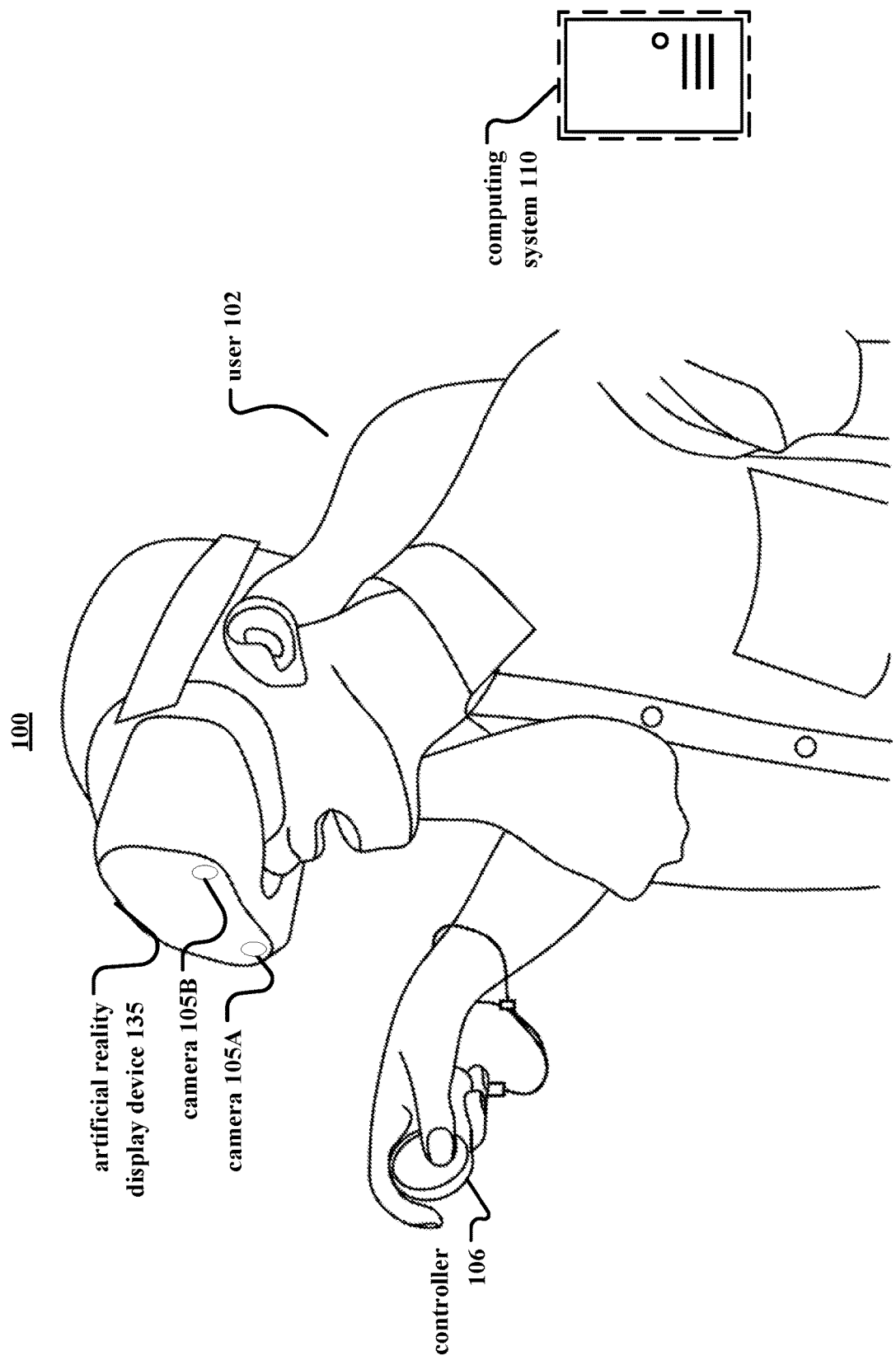
FIG. 1 illustrates an example artificial reality system.

FIG. 1 illustrates an example artificial reality system 100 and a user 102. In particular embodiments, the artificial reality system 100 may comprise a head-mounted artificial reality display device 135, a controller 106, and one or more computing systems 110. The artificial reality display device 135 may be worn over the user's eyes and provide visual content to the user 102 through internal displays (not shown). The artificial reality display device 135 may have two separate internal displays, one for each eye of the user 102 (single display devices are also possible).

The artificial reality system 100 may further have one or more controllers 106 that enable the user 102 to provide inputs. The controller 106 may communicate with the artificial reality display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. As an example and not by way of limitation, the controller 106 may have several infrared LEDs or other known observable features that collectively form a predetermined pattern. Using a sensor or camera, the artificial reality system 100 may be able to capture an image of the predetermined pattern on the controller. Based on the observed orientation of those patterns, the system may compute the controller's position and orientation relative to the sensor or camera.

The artificial reality system 100 may further include a one or more computing systems 110. The computing systems 110 may control the artificial reality display device 135 and the controller 106 to provide the artificial reality content to and receive inputs from the user 102. The one or more computing systems 110 may be a stand-alone unit that is physically separate from the artificial reality display device 135 or the computer system 110 may be integrated with the artificial reality display device 135. In embodiments where the one or more computing systems 110 is a separate unit, the one or more computing systems 110 may be communicatively coupled to the artificial reality display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depend upon the capabilities of its one or more computing systems 110.

In particular embodiments, the computing systems 110 may receive sensor data from one or more components of the artificial reality system 100. For example and not by way of limitation, the artificial reality display device 135 may include one or more external-facing cameras that capture a sequence of frames (e.g., as a video). The sensor data provided by such sensors may be used by the computing systems 110 to determine the device's current orientation and provide that orientation to the rendering engine to orient/reorient the virtual camera in the 3D space. In particular embodiments the computing systems 110 may utilize one or more sensor data with one or more tracking techniques to determine a pose of one or more components of artificial reality system 100. In particular embodiments the computing systems 110 may utilize one or more sensor data with one or more display techniques to present the environment as captured by the sensor data to a user wearing an HMD. Although images captured by the forward-facing cameras 105A-B may be directly displayed to the user 102 via the artificial reality display device 135, doing so may not provide the user with an accurate view of the physical environment since the cameras 105A-B may not be able to present exposure of the entire field of view that perfectly mimics how a human sees the physical environment without a camera.

Figure 2:
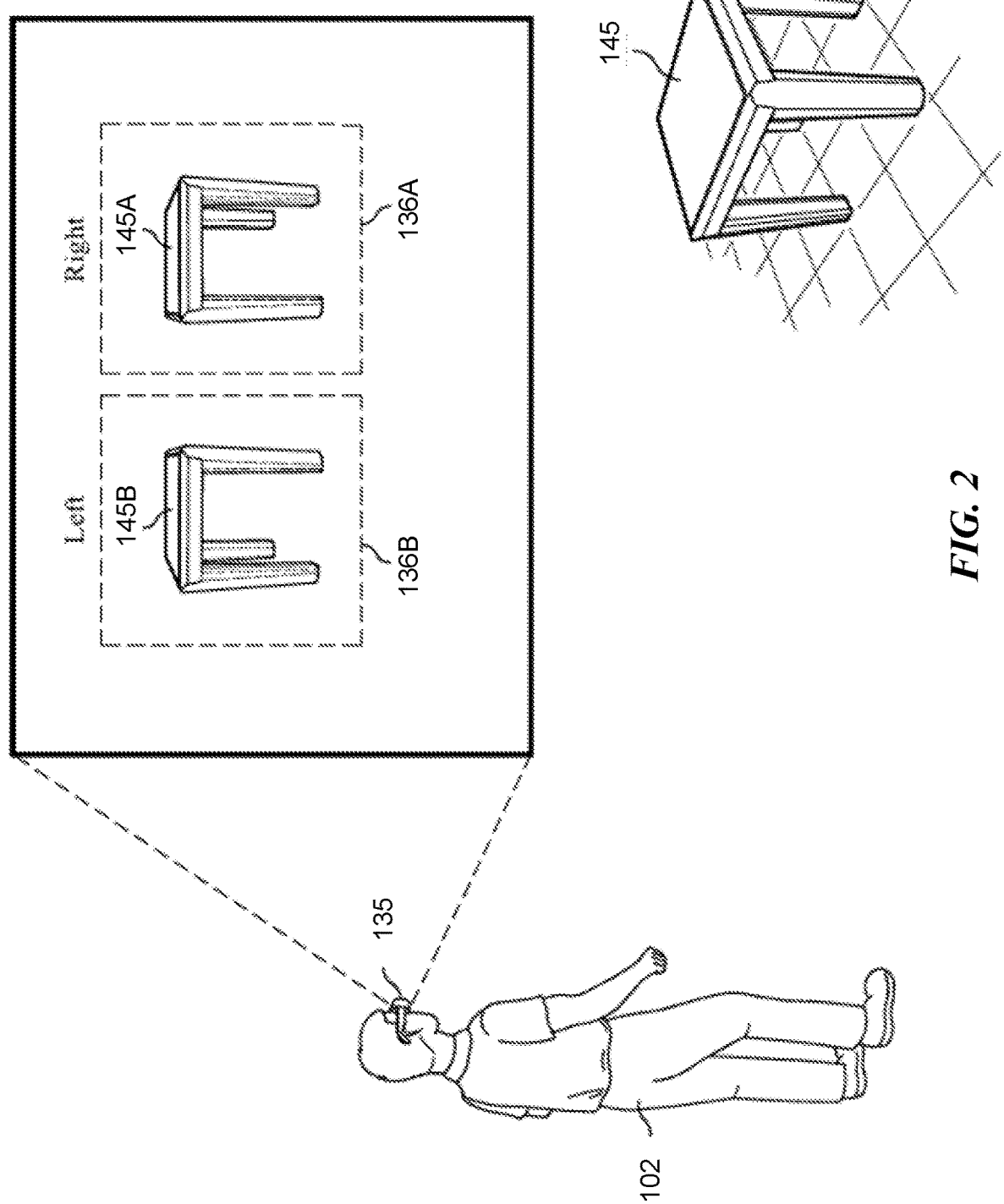
FIG. 2 illustrates exemplary frame data captured from sensors on an artificial reality display device.

FIG. 2 illustrates exemplary frame data captured from sensors on an artificial reality display device. A user 102 may be wearing an artificial reality display device 135, immersed within an artificial reality environment. A real-world object 145 is in the physical environment surrounding the user 102. Information about the physical environment surrounding the user may be captured using, for example, one or more cameras 105 such as external-facing cameras 105A-B (illustrated in FIG. 1). The artificial reality display device 135 may have external-facing cameras, such as the two forward-facing cameras 105A and 105B shown in FIG. 1. While only two forward-facing cameras 105A-B are shown, the artificial reality display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). Images captured by the forward-facing cameras may contain features present in the environment that may aid in the artificial reality display device's ability to track the environment and, for example, its position and orientation within the environment, to provide an immersive experience to the user.

In particular embodiments, the pose (e.g., position and orientation) of the artificial reality display device 135 within the environment may be needed. For example, in order to render the appropriate display for the user 102 while the user 102 is moving about in a virtual environment, the artificial reality system 100 may need to determine her position and orientation at any moment. Based on the pose of the artificial reality display device, the artificial reality system 100 may further determine the viewpoint of either of the cameras 105A and 105B or either of the user's eyes. The data generated by the external-facing cameras 105A-B allow the artificial reality system 100 to compute the pose of the artificial reality display device 135 using, for example, SLAM (simultaneous localization and mapping) or other suitable tracking techniques.

Figure 3:
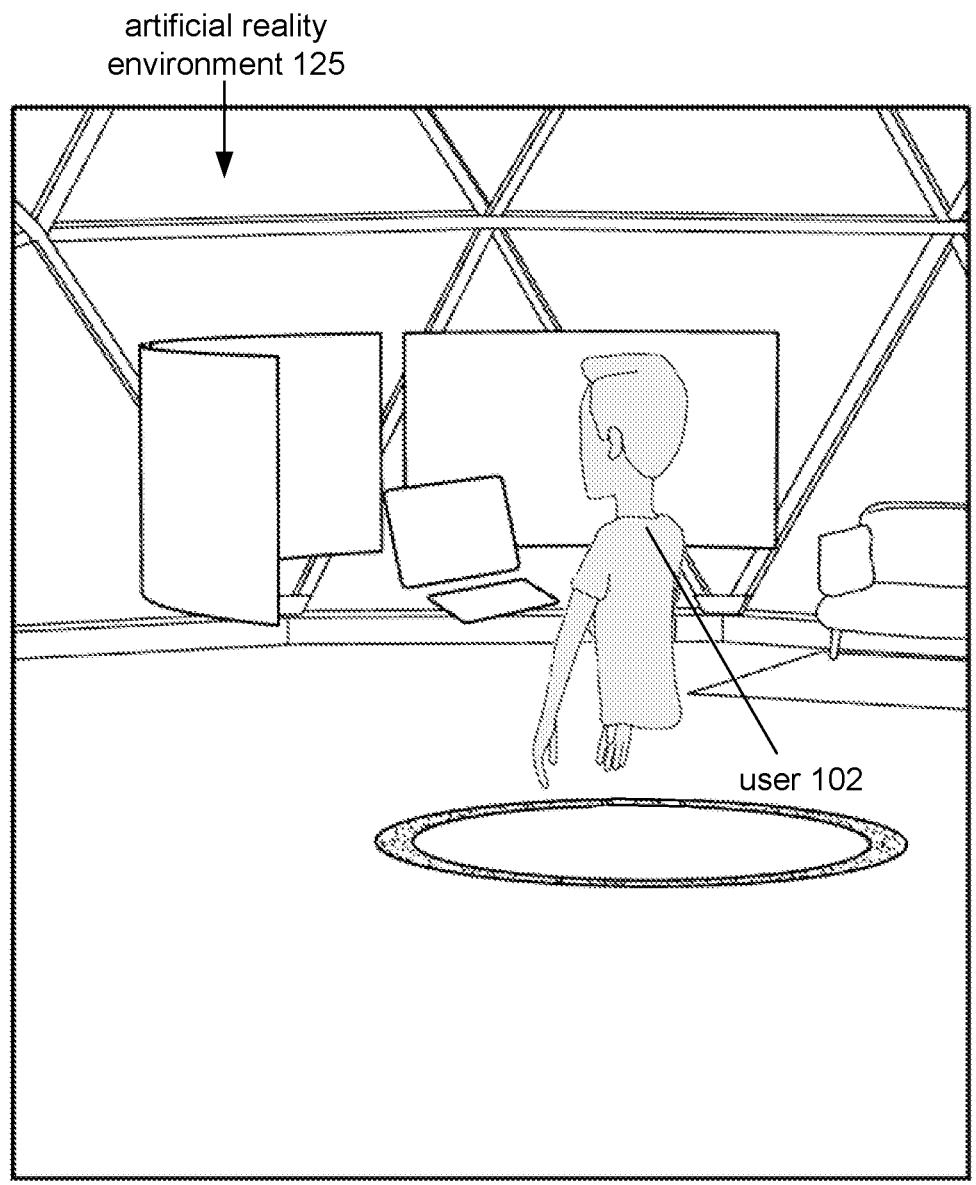
FIG. 3 illustrates an example user in an artificial reality environment.

FIG. 3 illustrates an example user in an artificial reality environment. The user 102 may be wearing an artificial reality display device 135 (not illustrated). The user 102 may be represented by an avatar in the artificial reality environment 125, as illustrated in FIG. 3. Using the artificial reality display device 135, the user may view the artificial reality environment 125 as rendered by the computer systems 110 based on, for example, position and orientation of the artificial reality display device within the surrounding environment.

An embodiment of gaze based automatic exposure control may be designed as follows. Through the external-facing cameras 105A-B of the artificial reality display device 135, a sequence of image frames of the surrounding physical environment may be captured. The frame data captured by the cameras 105A-B, however, may have unsatisfactory brightness levels such that environmental features and some environmental detail captured in the sequence of image frames is not visible to the user when the image frames are rendered and presented to the user via the artificial reality display device. For example, the captured image frames may be too bright for the user to be able to discern detail in an area of the frame the user wishes to see. Alternatively, the captured image frames may be too dark to discern features. As such, simply utilizing what the cameras 105A-B captured may not be the best presentation of the environment to the user and thus may not provide the best possible immersive experience. Utilizing what the cameras 105A-B captured may lead to exposure decisions based on data that is not of interest to the user or data that would negatively impact performance (such as a very dark or very bright region of a frame, e.g., from a bright direct light).

Artificial reality systems are utilized for a variety of applications, including allowing a user to experience viewing the physical environment through the use of an artificial reality display device in a mixed reality application, which may involve controlling brightness levels of images captured by sensors, such as one or more cameras, associated with an artificial reality display device. Cameras commonly use automatic exposure control (AEC) algorithms to adjust the brightness of captured image frames. These AEC algorithms are commonly optimized for the purpose of allowing human eyes to visualize details of a captured environment, but these algorithms modify the exposure of an image frame by taking into account the brightness level of the overall image or the brightness level of the center field of view of the image. Humans commonly look at certain regions of interest by moving their eyes, not necessarily by moving or turning their entire head. AEC algorithms that take into account center field of view or the overall image in making exposure decisions thus may not provide optimal exposure that would allow a user to visualize the details of a preferred region of interest in the camera's field of view.

Other cameras may use AEC algorithms which make exposure decisions based on tracking of faces within the image or based on a point selected by a user, but these AEC algorithms do not take into account image regions that the user is currently interested in viewing under optimal exposure conditions. Artificial reality systems which use sensors to capture environmental data for the purpose of presenting that environment back to a user wearing an artificial reality display device may benefit from exposure techniques which take into account a user's current region of interest in the environment. Conversely, these artificial reality systems may benefit from exposure techniques that take into account that other regions of an image frame may not need to be considered for exposure decisions because the user is not interested in those regions. It would be useful to provide a technique for optimizing frame exposure in which the AEC algorithm considers a user region of interest of a frame and thereby prioritize that region of interest for exposure decisions.

The present disclosure improves upon existing automatic exposure control (AEC) algorithms by using techniques to identify a user region of interest (ROI) of a frame that may be presented to the user wearing an artificial reality display device of an artificial reality system. Further techniques may include applying a temporal filtering algorithm to control against rapid or erratic temporal shifts in image frame exposure when the exposure changes are made on a continuous basis (e.g., to a sequence of image frames captured and presented to the user in real time). Such filtering may also be beneficial by aiding determination of the user's actual preferred region of interest as opposed to a region that the user's eye happens to move across for only a small number of frames. The AEC algorithm may then present an output (e.g., an exposure control parameter) based on the identified region of interest (ROI) such that the exposure of a frame is optimized for the region of interest (ROI).

In particular embodiments, a sensor associated with an artificial reality system may capture the physical environment around the user and may do so continuously to generate a sequence of frames (e.g., as a video). The frames may contain information about the environment surrounding the sensor, including walls and objects. A frame may also be referred to as an image plane, or an image frame. FIG. 2, as previously explained, illustrates exemplary frame data captured from sensors on an artificial reality display device, showing information about the environment surrounding the sensor, including real-world object 145. For a frame captured by a sensor, a user region of interest (ROI) may be determined. Specifically, the ROI may comprise a two-dimensional spatial area on the image plane. Cameras commonly use frame average AEC region of interest (ROI) and center-weighted AEC region of interest (ROI) for existing automatic exposure control (AEC) algorithms to determine an ROI.

Figure 4:
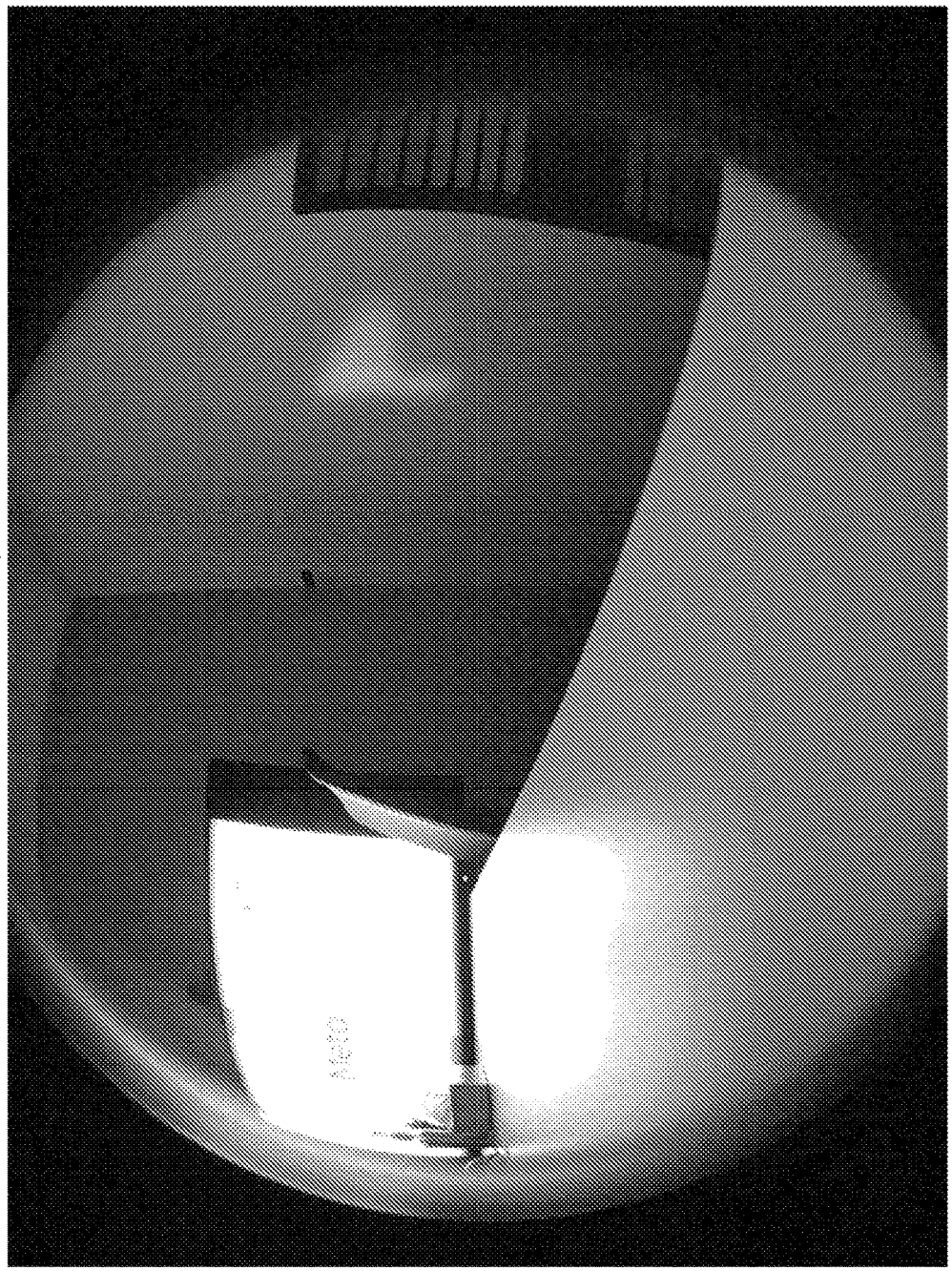
FIG. 4 illustrates an exemplary image frame captured by a sensor associated with an artificial reality system.

FIG. 4 illustrates an exemplary image frame captured by a sensor associated with an artificial reality system. FIG. 4 is an illustration showing, for example, an application of a frame average automatic exposure control (AEC) algorithm to frame 400. As can be seen in FIG. 4, a monitor in the physical environment is captured by the sensor, but it is visually difficult to view any details related to the monitor's screen as it is captured in FIG. 4 because the AEC algorithm which was applied to the image frame resulted in an overexposed image.

In particular embodiments, a user region of interest (ROI) for a frame may be determined by using a gaze detection technique to determine which region the user is currently focused on. Once the ROI is determined, an automatic exposure control (AEC) algorithm may be employed after determining the temporal stability of the user's gaze to adjust the frame's brightness.

Figure 5:
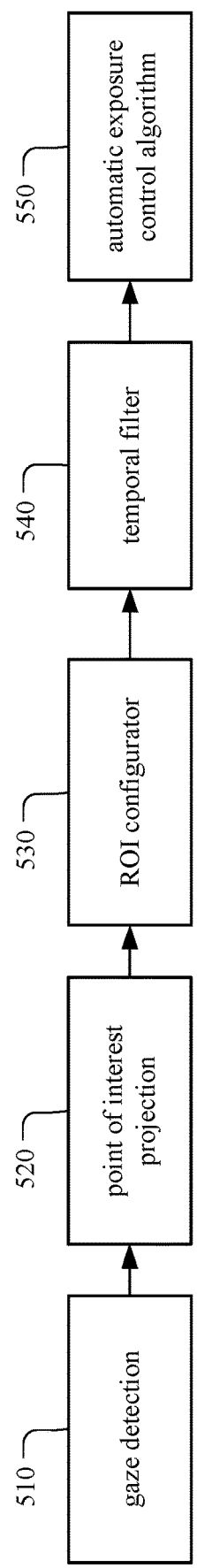
FIG. 5 is a block diagram illustrating an example embodiment of a gaze based automatic exposure control (AEC) algorithm.

FIG. 5 is a block diagram illustrating an example embodiment of a gaze based automatic exposure control (AEC) algorithm. At block 510, a computing system may detect a gaze of a user. Gaze detection may involve detecting an area of an input image which the user is currently looking at. In particular embodiments, the computing system may receive an eye gaze of a user, such as that determined by an eye tracker technique. A gaze detection algorithm may determine a user's eye gaze (also referred to as a user's gaze). The determination may involve projecting a three-dimensional vector onto the image plane based on coordinates (e.g., gaze tracking coordinate, headset coordinate, camera coordinate). A point of intersection on the image plane may be the user's gaze point, which may be associated with a point of interest on the image plane. Gaze detection may involve an eye tracking technique of an artificial reality display device such as an artificial reality headset or head mounted display (HMD). An input image may be a first frame of a plurality of sequential frames comprising a video. A frame may be generated by the computing system. Frame generation may involve one or more sensors (e.g., cameras) associated with an artificial reality system. Gaze detection may involve predicting a future user gaze. For example, a predicted eye gaze may be determined using a head position of the user, a predicted or estimated motion of the user, or eye tracking prediction technique.

At block 520, the computing system may determine a point of interest on the image plane. The point of interest may be determined based on the gaze point. The point of interest may be a predicted point of interest determined based on, for example, the predicted user gaze.

At block 530, the computing system may configure a user region of interest (ROI). The user region of interest may comprise a spatial area of an input image. The user region of interest may be determined based on the point of interest projection determined at block 520 The user region of interest may be determined by expanding a determined gaze point to encompass a region. The user ROI may be configured based on additional data in combination with user gaze point. For example, the user ROI may be determined based on a configured region width and height, which may be predetermined. As another example, the user ROI may be determined by expanding the gaze point to encompass an object captured on the image plane by utilizing information about a determined location of the object on the image plane. The point of interest may be expanded, for example, to an object overlapping the point of interest on the image plane based on information received about the object location. As a further example, the user ROI may be determined based on depth information (e.g., determining that the gaze point is located on a foreground/background portion of the image plane). The user region of interest may also be determined based on the user's determined facial expression, obtained from inward facing cameras of the artificial reality system. In embodiments in which one or more of these additional bases are used to determine user ROI, the user gaze information may be assigned a weight indicating an amount of influence the user gaze point may have on the user ROI determination process. The user region of interest for a frame may be a user's current region of interest on the image plane.

At block 540, the computing system may determine a temporal stability of the user's gaze. Determining temporal stability of the user's gaze may involve determining whether the user region of interest is in a stable state or an unstable state. Determining temporal stability of the user's gaze may involve comparing a first region of interest for a first frame with a second region of interest for a second frame. In particular embodiments, a two-threshold hysteresis detection algorithm may be employed for determining temporal stability. In particular embodiments where the user region of interest is determined on an ongoing basis, computing system may compare the user's current region of interest over a plurality of past or previous frames in the sequence. If the user region of interest comprises the same spatial area over a threshold number of frames, then the temporality stability may be determined to be in a stable state. The user region of interest may be determined to be within an acceptable margin of difference from one or more past regions of interest. If temporal stability of the user's gaze is determined to be in a stable state, then the computing system may employ an automatic exposure control (AEC) algorithm to adjust camera exposure based on the user ROI, as further explained at block 550 below. Conversely, if the user region of interest comprises different spatial areas of the image plane over a plurality of sequential frames, then the temporal stability may be determined to be in an unstable state. For example, a user region of interest may be determined for a first frame, a second frame, and an nth frame in a plurality of sequential frames, the first frame being located temporally before the second frame, and the second frame being located temporally before the nth frame. A user region of interest for the first frame may be compared to the user region of interest for the second frame, and may also be compared to the user region of interest for one or more frames up to the nth frame, in order to determine a number of frames for which the user region of interest is the same. A stable temporal stability may be associated with a threshold number of frames.

At block 550, the computing system may utilize an automatic exposure control (AEC) algorithm. The AEC algorithm may use as input information on the configured user ROI for a frame which was configured at block 530, described above. Using the ROI information, the AEC algorithm may determine an output. The output may comprise an exposure control parameter, e.g., exposure time for the frame sensor, a gain, or both. As an example, a camera capturing a sequence of frames may use the exposure time and/or gain output by the AEC algorithm on the next frame in the sequence. If the temporal stability of the user's gaze is determined to be in a stable state, then the computing system may employ an automatic exposure control (AEC) algorithm to adjust camera exposure based on the user ROI. If, conversely, the temporal stability of the user's gaze is determined to be in an unstable state, then the computing system will adjust the camera's exposure based on a default ROI (e.g. frame-average ROI or center-weighted ROI). Blocks 510-540 may be repeated for each frame in a plurality of frames in a sequence. If the temporal stability of the user's gaze is determined to be stable with respect to a frame in the sequence, then the AEC algorithm may be employed at block 550 to adjust image brightness.

As previously explained, a user ROI may be configured based on information in addition to a user gaze in particular embodiments. Similarly, the AEC algorithm may use as input information in addition to the user ROI, such as another region or regions of the image plane. For example, the user ROI may be associated with a weight, indicating an amount of influence the user ROI has over the AEC algorithm. For example, a user ROI weight value of 100% may indicate that the AEC algorithm base its output entirely on the user ROT. Or, a user ROI weight value of 50% may indicate that the AEC algorithm base its output half on the user ROT. In particular embodiments, if the user ROI weight is 50%, then the AEC algorithm may base its output half on information from the user ROI and half on information of the frame as a whole. In other embodiments, the AEC algorithm may utilize additional information in determining an output. A user ROI weight value may allow the computing system to determine whether and how much to prioritize the user ROI in making exposure and/or gain decisions for a camera or cameras, and how much to prioritize other information. The ROI weight value may be itself adjusted based on other information. The ROI weight may be based on the determination of temporal stability of the eye gaze. As an example, the AEC algorithm may utilize a user's mood (or feeling) determined from the user's facial expressions to determine image brightness. A camera or cameras associated with an artificial reality device may be instructed to capture an image using the output of the AEC algorithm. The resultant image or images may be rendered and presented to the user with an artificial reality head mounted device (HMD).

Figure 6:
FIG. 6 illustrates an exemplary image frame captured by a sensor associated with an artificial reality system after employing gaze based automatic exposure control (AEC) to adjust camera exposure.

FIG. 6 illustrates an exemplary image frame captured by a sensor associated with an artificial reality system after employing gaze based automatic exposure control (AEC) to adjust camera exposure. In FIG. 6, frame 600 is shown after a gaze based AEC algorithm is employed. As can be seen, a monitor in the physical environment is captured by the sensor, and both it and the contents of its screen are visible because the AEC algorithm was employed to optimize exposure as to the monitor region of the image plane based on the determination that the user is looking at the monitor. Compared to FIG. 4, showing the same view of the same environment, frame 600 is better optimized for a user to view the contents of the monitor than frame 400.

Referring again to FIG. 5, blocks 510-550 may be repeated. As an example, a camera capturing a sequence of frames may use the exposure time and/or gain output by the AEC algorithm on the next frame in the sequence. The gaze based AEC algorithm may act as an ongoing exposure control to improve exposure in a continuously-captured sequence of frames (i.e., as a continuously-captured video) of the environment. In particular embodiments, when a sensor captures a sequence of frames (e.g., as a video), the data is provided by such sensor may be used by the computing systems 110 to render and present a visualization of the environment to a user wearing a head mounted display (HMD) or other artificial reality headset. The gaze based AEC algorithm, by basing its exposure and/or gain output only on frame regions which the user is interested in, may improve the immersive experience of the user by optimizing exposure of the spatial area the user wants to see clearly.

Figure 7:
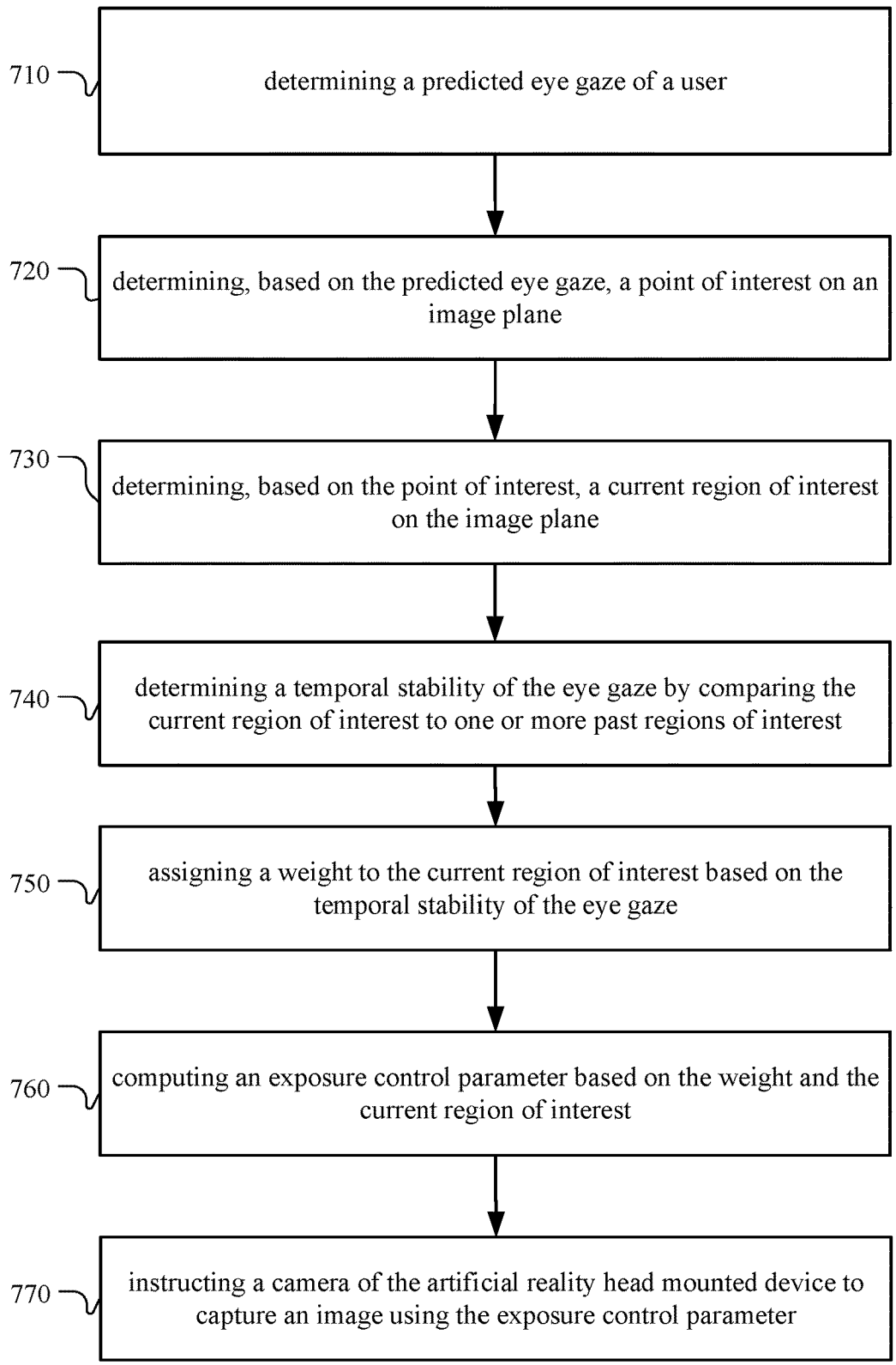
FIG. 7 illustrates an example method for configuring exposure.

FIG. 7 illustrates an example method 700. The method may begin at step 710, where a predicted eye gaze of a user is determined. At step 720, a point of interest on an image plane is determined based on the eye gaze. At step 730, a current region of interest on the image plane is determined based on the point of interest. At step 740, a temporal stability of the eye gaze is determined by comparing the current region of interest to one or more past regions of interest. At step 750, a weight is assigned to the current region of interest based on the temporal stability of the eye gaze. At step 760, an exposure control parameter is computed based on the weight and the current region of interest. At step 770, a camera of the artificial reality head mounted device is instructed to capture an image using the exposure control parameter. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for configuring exposure including the particular steps of the method of FIG. 7, this disclosure contemplates any suitable method for configuring exposure including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
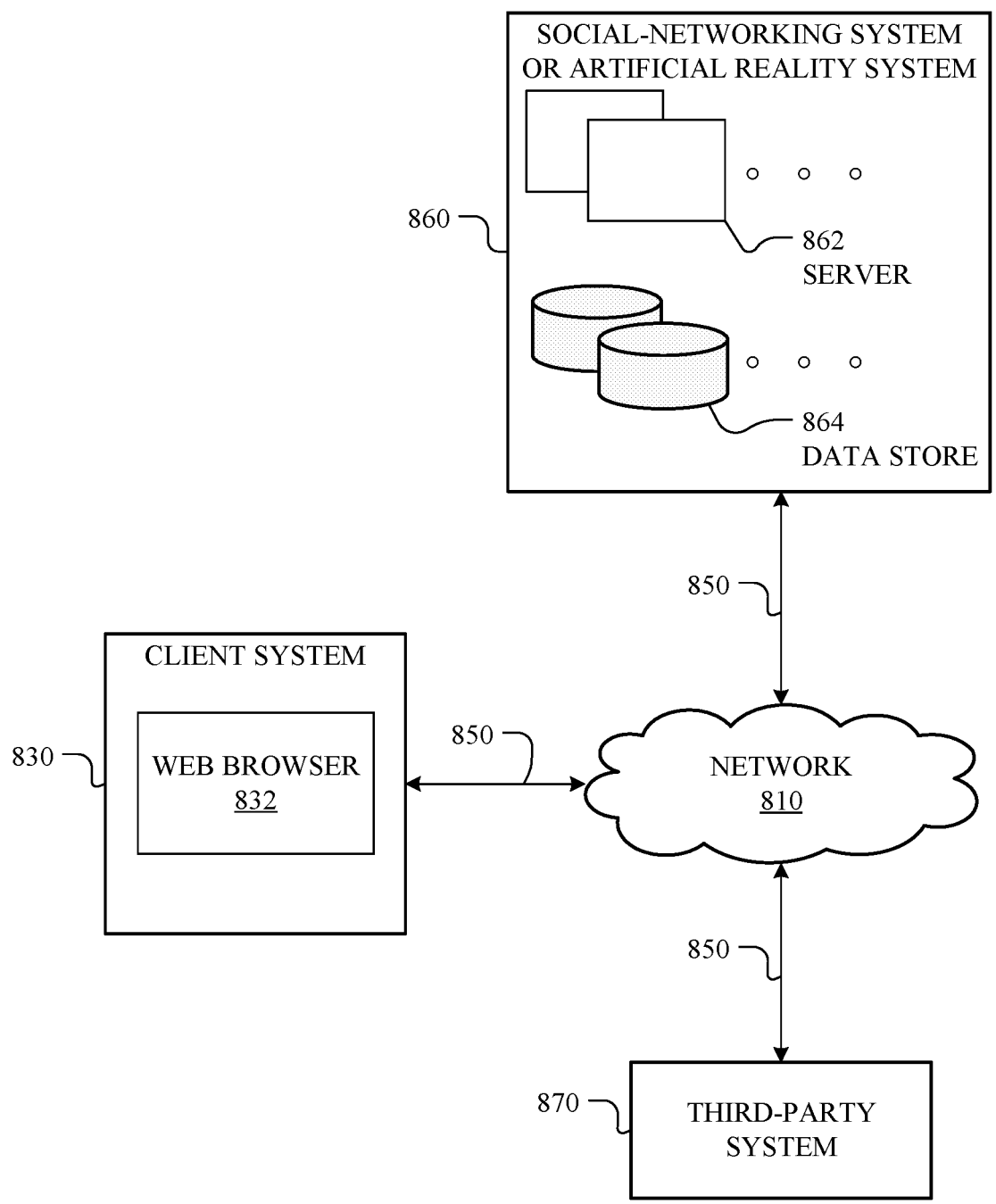
FIG. 8 illustrates an example network environment associated with a social-networking system.

FIG. 8 illustrates an example network environment 800 associated with an artificial reality or social-networking system. Network environment 800 includes a client system 830, an artificial reality or social-networking system 860, and a third-party system 870 connected to each other by a network 810. Although FIG. 8 illustrates a particular arrangement of client system 830, artificial reality or social-networking system 860, third-party system 870, and network 810, this disclosure contemplates any suitable arrangement of client system 830, artificial reality or social-networking system 860, third-party system 870, and network 810. As an example and not by way of limitation, two or more of client system 830, artificial reality or social-networking system 860, and third-party system 870 may be connected to each other directly, bypassing network 810. As another example, two or more of client system 830, artificial reality or social-networking system 860, and third-party system 870 may be physically or logically co-located with each other in whole or in part. Moreover, although FIG. 8 illustrates a particular number of client systems 830, artificial reality or social-networking systems 860, third-party systems 870, and networks 810, this disclosure contemplates any suitable number of client systems 830, artificial reality or social-networking systems 860, third-party systems 870, and networks 810. As an example and not by way of limitation, network environment 800 may include multiple client system 830, artificial reality or social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, artificial reality or social-networking system 860 may be a network-addressable computing system that may host an online Virtual Reality environment or social network. artificial reality or social-networking system 860 may generate, store, receive, and send social-networking data, such as, for example, user-profile data, concept-profile data, social-graph information, or other suitable data related to the online social network. Social-networking or artificial reality system 860 may be accessed by the other components of network environment 800 either directly or via network 810. As an example and not by way of limitation, client system 830 may access social-networking or artificial reality system 860 using a web browser, or a native application associated with social-networking or artificial reality system 860 (e.g., a mobile social-networking application, a messaging application, another suitable application, or any combination thereof) either directly or via network 810. In particular embodiments, social-networking or artificial reality system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking or artificial reality system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking or artificial reality system 860, or a third-party system 870 to manage, retrieve, modify, add, or delete, the information stored in data store 864.

In particular embodiments, social-networking or artificial reality system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking or artificial reality system 860 may provide users of the online social network the ability to communicate and interact with other users. In particular embodiments, users may join the online social network via social-networking or artificial reality system 860 and then add connections (e.g., relationships) to a number of other users of social-networking or artificial reality system 860 to whom they want to be connected. Herein, the term "friend" may refer to any other user of social-networking or artificial reality system 860 with whom a user has formed a connection, association, or relationship via social-networking or artificial reality system 860.

In particular embodiments, social-networking or artificial reality system 860 may provide users with the ability to take actions on various types of items or objects, supported by social-networking or artificial reality system 860. As an example and not by way of limitation, the items and objects may include groups or social networks to which users of social-networking or artificial reality system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or artificial reality system 860 or by an external system of third-party system 870, which is separate from social-networking or artificial reality system 860 and coupled to social-networking or artificial reality system 860 via a network 810.

In particular embodiments, social-networking or artificial reality system 860 may be capable of linking a variety of entities. As an example and not by way of limitation, social-networking or artificial reality system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking or artificial reality system 860. In particular embodiments, however, social-networking or artificial reality system 860 and third-party systems 870 may operate in conjunction with each other to provide social-networking services to users of social-networking or artificial reality system 860 or third-party systems 870. In this sense, social-networking or artificial reality system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or artificial reality system 860 also includes user-generated content objects, which may enhance a user's interactions with social-networking or artificial reality system 860. User-generated content may include anything a user can add, upload, send, or "post" to social-networking or artificial reality system 860. As an example and not by way of limitation, a user communicates posts to social-networking or artificial reality system 860 from a client system 830. Posts may include data such as status updates or other textual data, location information, photos, videos, links, music or other similar data or media. Content may also be added to social-networking or artificial reality system 860 by a third-party through a "communication channel," such as a newsfeed or stream.

In particular embodiments, social-networking or artificial reality system 860 may include a variety of servers, subsystems, programs, modules, logs, and data stores. In particular embodiments, social-networking or artificial reality system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or artificial reality system 860 may also include suitable components such as network interfaces, security mechanisms, load balancers, failover servers, management-and-network-operations consoles, other suitable components, or any suitable combination thereof. In particular embodiments, social-networking or artificial reality system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or artificial reality system 860 to one or more client systems 830 or one or more third-party system 870 via network 810. The web server may include a mail server or other messaging functionality for receiving and routing messages between social-networking or artificial reality system 860 and one or more client systems 830. An API-request server may allow a third-party system 870 to access information from social-networking or artificial reality system 860 by calling one or more APIs. An action logger may be used to receive communications from a web server about a user's actions on or off social-networking or artificial reality system 860. In conjunction with the action log, a third-party content-object log may be maintained of user exposures to third-party content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking or artificial reality system 860. A privacy setting of a user determines how particular information associated with a user may be shared. The authorization server may allow users to opt in to or opt out of having their actions logged by social-networking or artificial reality system 860 or shared with other systems (e.g., third-party system 870), such as, for example, by setting appropriate privacy settings. Third-party content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
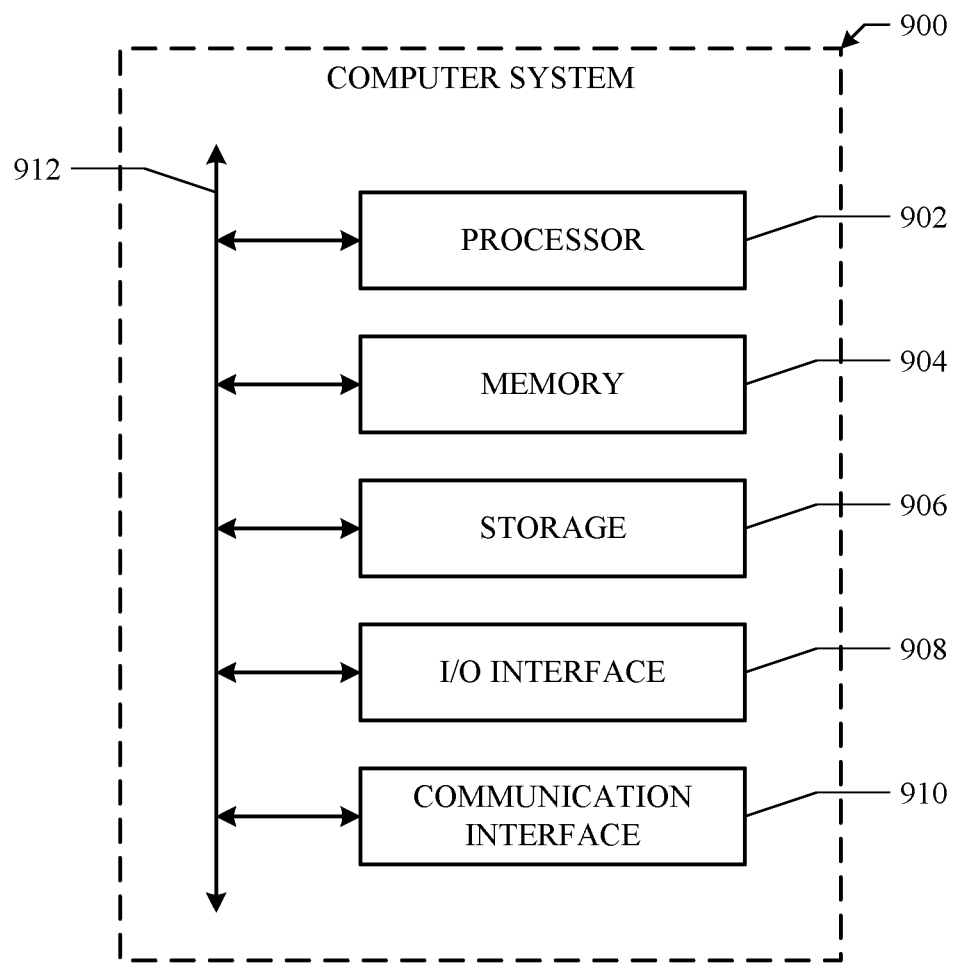
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/artificial reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
  determining a predicted eye gaze of a user;
  determining, based on the predicted eye gaze, a point of interest on an image plane;
  determining, based on the point of interest, a current region of interest on the image plane;
  determining a temporal stability of the predicted eye gaze by comparing the current region of interest to one or more past regions of interest;
  assigning a weight to the current region of interest based on the temporal stability of the eye gaze;
  computing an exposure control parameter based on the weight and the current region of interest;
  instructing a camera of an artificial reality head mounted device to capture an image using the exposure control parameter.

2. The method of claim 1, wherein determining the current region of interest comprises:
  expanding, from the point of interest, to a predetermined region width and height.

3. The method of claim 1, wherein determining the current region of interest comprises:
  receiving object location information of an object overlapping the point of interest on the image plane; and
  configuring the current region of interest as overlapping the object on the image plane.

4. The method of claim 1, wherein determining the temporal stability of the predicted eye gaze comprises:
  comparing the current region of interest to one of the past regions of interest;
  determining that the current region of interest and the past region of interest comprises the same region of the image plane by comparing pixels of the current region of interest and pixels of the past region of interest; and
  if the current region of interest comprises the same spatial area over a threshold number of frames, then the temporal stability is determined to be in a stable state.

5. The method of claim 1, wherein the temporal stability is determined by a hysteresis detection algorithm.

6. The method of claim 1, wherein computing the exposure control parameter is further based on one or more other regions of the image plane in proportion to the weight of the current region of interest.

7. The method of claim 1, further comprising:
presenting, to the user, the image captured using the exposure control parameter.

8. The method of claim 1, further comprising:
determining that the temporal stability of the predicted eye gaze is stable based on the comparison of the current region of interest to one or more of the past regions of interest.

9. The method of claim 1, wherein the image plane comprises a visual representation of an environment surrounding the user wearing the artificial reality head mounted device.

10. One or more computer-readable non-transitory storage media embodying software that is operable when executed to:
determining a predicted eye gaze of a user;
determine, based on the predicted eye gaze, a point of interest on an image plane;
determine, based on the point of interest, a current region of interest on the image plane;
determine a temporal stability of the predicted eye gaze by comparing the current region of interest to one or more past regions of interest;
assign a weight to the current region of interest based on the temporal stability of the predicted eye gaze;
compute an exposure control parameter based on the weight and the current region of interest;
instruct a camera of an artificial reality head mounted device to capture an image using the exposure control parameter.

11. The media of claim 10, wherein the software is further operable when executed to:
determine the current region of interest by expanding, from the point of interest, to a predetermined region width and height.

12. The media of claim 10, wherein the software is further operable when executed to:
determine the current region of interest by:
receiving object location information of an object overlapping the point of interest on the image plane; and
configuring the current region of interest as overlapping the object on the image plane.

13. The media of claim 10, wherein the software is further operable when executed to:
determine the temporal stability of the predicted eye gaze by:
comparing the current region of interest to one of the past regions of interest;
determining that the current region of interest and the past region of interest comprises the same region of the image plane; and
determining that the current region of interest has not changed over a threshold number of past regions of interest.

14. The media of claim 10, wherein the temporal stability is determined by a hysteresis detection algorithm.

15. The media of claim 10, wherein computing the exposure control parameter is further based on one or more other regions of the image plane in proportion to the weight of the current region of interest.

16. The media of claim 10, wherein the software is further operable when executed to:
present, to the user, the image captured using the exposure control parameter.

17. The media of claim 10, wherein the software is further operable when executed to:
determine that the temporal stability of the predicted eye gaze is stable based on the comparison of the current region of interest to one or more of the past regions of interest.

18. The media of claim 10, wherein the image plane comprises a visual representation of an environment surrounding the user wearing the artificial reality head mounted device.

19. A system comprising:
an artificial reality head mounted device;
one or more processors; and
one or more computer-readable non-transitory storage media coupled to one or more of the processors and comprising instructions operable when executed by one or more of the processors to cause the system to:
determine a predicted eye gaze of a user;
determine, based on the predicted eye gaze, a point of interest on an image plane;
determine, based on the point of interest, a current region of interest on the image plane;
determine a temporal stability of the predicted eye gaze by comparing the current region of interest to one or more past regions of interest;
assign a weight to the current region of interest based on the temporal stability of the predicted eye gaze;
compute an exposure control parameter based on the weight and the current region of interest;
instruct a camera of the artificial reality head mounted device to capture an image using the exposure control parameter.

20. The system of claim 19, wherein computing the exposure control parameter is further based on one or more other regions of the image plane in proportion to the weight of the current region of interest.

* * * * *